United States Patent
Foerster et al.

(10) Patent No.: US 11,566,548 B2
(45) Date of Patent: Jan. 31, 2023

(54) CATALYTICALLY ACTIVE PARTICLE FILTER WITH A HIGH DEGREE OF FILTRATION EFFICIENCY

(71) Applicant: UMICORE AG & CO. KG, Hanau-Wolfgang (DE)

(72) Inventors: Martin Foerster, Büdingen (DE); Juergen Koch, Hanau (DE); Manuel Gensch, Aschaffenburg (DE); Naina Deibel, Pfungstadt (DE); Antje Oltersdorf, Freiburg (DE); Jan Schoenhaber, Darmstadt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/292,059

(22) PCT Filed: Nov. 7, 2019

(86) PCT No.: PCT/EP2019/080479
§ 371 (c)(1),
(2) Date: May 7, 2021

(87) PCT Pub. No.: WO2020/094760
PCT Pub. Date: May 14, 2020

(65) Prior Publication Data
US 2021/0396167 A1    Dec. 23, 2021

(30) Foreign Application Priority Data
Nov. 8, 2018   (DE) .................. 10 2018 127 955.8

(51) Int. Cl.
*F01N 3/035*   (2006.01)
*F01N 3/022*   (2006.01)
*B01D 46/24*   (2006.01)

(52) U.S. Cl.
CPC ......... *F01N 3/035* (2013.01); *B01D 46/2451* (2013.01); *B01D 46/2474* (2013.01);
(Continued)

(58) Field of Classification Search
CPC .............. F01N 3/035; F01N 3/0222; F01N 2510/0682; F01N 2330/06; F01N 2330/60;
(Continued)

(56) References Cited

U.S. PATENT DOCUMENTS 108,408 A    10/1870   Tilghman
1,967,235 A   7/1934   Ferkel
(Continued)

FOREIGN PATENT DOCUMENTS

DE    948415 C    8/1956
DE    952891 C   11/1956
(Continued)

OTHER PUBLICATIONS

U.S. Appl. No. 17/292,068, Foerster, et al., filed May 7, 2021.
(Continued)

*Primary Examiner* — Phutthiwat Wongwian
*Assistant Examiner* — Diem T Tran
(74) *Attorney, Agent, or Firm* — Smith, Gambrell & Russell, LLP

(57) ABSTRACT

The invention relates to a wall-flow filter as a particle filter with catalytically active coatings in the channels which are closed in a gas-tight manner at the opposing closed ends of the channels A at the first end, wherein the inlet region of the filter is additionally supplied with a dry powder-gas aerosol which contains metal compounds with a high melting point (such as the metal oxides Al2O3, SiO2, FeO2, TiO2, ZnO2, etc. for example) and which is to simultaneously improve (Continued)

the catalytic activity and the degree of filtration efficiency with respect to the exhaust gas back-pressure.

21 Claims, 7 Drawing Sheets

(52) U.S. Cl.
CPC ..... *B01D 46/2482* (2021.08); *B01D 46/2484* (2021.08); *B01D 46/2498* (2021.08); *B01D 46/24492* (2021.08); *F01N 3/0222* (2013.01); *F01N 2330/06* (2013.01); *F01N 2330/60* (2013.01); *F01N 2510/0682* (2013.01)

(58) Field of Classification Search
CPC ............ F01N 2510/06; F01N 2510/063; B01J 2523/00; B01J 2523/17; B01J 2523/25; B01J 2523/31; B01J 2523/3706; B01J 2523/3712; B01J 2523/48; B01J 2523/72; B01J 2523/842; B01J 35/04; B01J 37/024; B01D 46/24492; B01D 46/2474; C04B 35/195
See application file for complete search history.

(56) References Cited

U.S. PATENT DOCUMENTS

| | | | |
|---|---|---|---|
| 2,488,440 | A | 11/1949 | Schaumann |
| 4,609,563 | A | 9/1986 | Shimrock et al. |
| 6,220,791 | B1 | 4/2001 | Hutchins |
| 6,478,874 | B1 | 11/2002 | Rosynsky et al. |
| 6,548,105 | B2 | 4/2003 | Kiessling et al. |
| 6,875,725 | B2 | 4/2005 | Lindner et al. |
| 8,277,880 | B2 | 10/2012 | Sato et al. |
| 8,388,721 | B2 | 3/2013 | Ishizawa |
| 8,454,917 | B2 | 6/2013 | Hoyer et al. |
| 8,495,968 | B2 | 7/2013 | Tsuji et al. |
| 8,534,221 | B2 | 9/2013 | Tsuji et al. |
| 8,632,852 | B2 | 1/2014 | Tsuji et al. |
| 8,663,588 | B2 | 3/2014 | Lindner et al. |
| 8,678,196 | B2 | 3/2014 | Kaiser et al. |
| 8,794,178 | B2 | 8/2014 | Mergner et al. |
| 9,517,462 | B2 | 12/2016 | Roesch et al. |
| 9,745,227 | B2 | 8/2017 | Cai et al. |
| 2001/0003351 | A1 | 6/2001 | Chen et al. |
| 2008/0107806 | A1 | 5/2008 | Mergner et al. |
| 2011/0030346 | A1* | 2/2011 | Neubauer ................ B01J 29/85 60/274 |
| 2011/0229634 | A1 | 9/2011 | Tsuji et al. |
| 2011/0229635 | A1* | 9/2011 | Tsuji .................... B05B 7/1486 118/712 |
| 2016/0310935 | A1* | 10/2016 | Sutton ...................... B01J 23/42 |
| 2017/0296969 | A1* | 10/2017 | Ohashi ................ B01D 53/9454 |

FOREIGN PATENT DOCUMENTS

| | | | |
|---|---|---|---|
| DE | 4225970 | C1 | 4/1994 |
| DE | 19921409 | A1 | 11/2000 |
| DE | 102009010711 | A1 | 9/2010 |
| DE | 102010007499 | A1 | 8/2011 |
| DE | 102010015364 | A1 | 10/2011 |
| EP | 1 064 094 | B1 | 9/2002 |
| EP | 1 181 970 | B1 | 2/2004 |
| EP | 1 136 462 | B1 | 8/2004 |
| EP | 1 576 998 | A2 | 9/2005 |
| EP | 2 388 072 | A1 | 11/2011 |
| EP | 2 412 419 | A1 | 2/2012 |
| EP | 2 415 522 | A1 | 2/2012 |
| EP | 2 502 661 | A2 | 9/2012 |
| EP | 2 521 618 | B1 | 8/2013 |
| EP | 1 541 220 | B1 | 2/2014 |
| EP | 2 727 640 | A1 | 5/2014 |
| EP | 2 502 662 | B1 | 6/2014 |
| EP | 2 783 755 | A1 | 10/2014 |
| EP | 2 576 021 | B1 | 12/2014 |
| EP | 2 832 962 | A1 | 2/2015 |
| EP | 2 371 451 | B1 | 3/2016 |
| EP | 2 371 452 | B1 | 3/2016 |
| EP | 1 789 190 | B1 | 6/2017 |
| JP | H01-151706 | A | 6/1989 |
| JP | 5378659 | B2 | 12/2013 |
| JP | 2014-205108 | A | 10/2014 |
| WO | 99/47260 | A1 | 9/1999 |
| WO | 2005/016497 | A1 | 2/2005 |
| WO | 2005/022667 | A2 | 3/2005 |
| WO | 2008/000449 | A2 | 1/2008 |
| WO | 2008/113445 | A1 | 9/2008 |
| WO | 2010/015573 | A2 | 2/2010 |
| WO | 2010/097146 | A1 | 9/2010 |
| WO | 2011/151711 | A1 | 12/2011 |
| WO | 2012/030534 | A1 | 3/2012 |
| WO | 2015/049110 | A1 | 4/2015 |
| WO | 2015/143191 | A1 | 9/2015 |
| WO | WO 2017056067 | * | 4/2017 |
| WO | 2018/115900 | A1 | 6/2018 |
| WO | 2018/172299 | A1 | 9/2018 |
| WO | 2020/094763 | A1 | 5/2020 |
| WO | 2020/094766 | A1 | 5/2020 |

OTHER PUBLICATIONS

U.S. Appl. No. 17/292,080, Foerster, et al., filed May 7, 2021.
International Preliminary Report on Patentability dated May 11, 2021 for International Patent Application No. PCT/EP2019/080479 (7 pages in German with English Translation).
Written Opinion of the International Searching Authority dated Feb. 24, 2020 for International Patent Application No. PCT/EP2019/080479 (6 pages in German with English Translation).
International Search Report dated Feb. 24, 2020 for International Patent Application No. PCT/EP2019/080479 (4 pages in German with English Translation).
Gutsch, A et al. Gas-Phase Production of Nanoparticles. KONA. 2002. No. 20. 14 pages.
Ulrich, G. Theory of Particle Formation and Growth in Oxide Synthesis Flames. Combustion Science and Technology, 1971. vol. 4. pp. 47-57.
Ihalainen, M., et al. Break-Up and bounce of $TiO_2$ agglomerates by impaction. J. In: Aerosol Science and Technology. 2014. vol. 48, No. 1, pp. 31-41.
Seipenbusch, M., et al. Interparticle forces in silica nanoparticle agglomerates Journal of Nanoparticle Research. 2010. vol. 12, No. 6, pp. 2037-2044.
Gensch, M. Dissertation, Mechanische Stabilität von Nanopartikel-Agglomeraten bei mechanischen Belastungen. 2018. ISBN: 978-3-8440-6110-9, Shaker Verlag.
Füchsel, S., et al. Trockene Desagglomeration von Nanopartikelagglomeraten in einer Sichtermhle. [Dry deagglomeration of nanoparticle agglomerates in a classifier mill]. Chemie Ingenieur Technik. 2011, 83, No. 8, pp. 1262-1275. (In German with English translation).
Li S., et al. Flame aerosol synthesis of nanostructured materials and functional devices: Processing, modeling, and diagnostics. Progress in Energy and Combustion Science (55). 2016. pp. 1-59.
Heck, R., et al., Catalytic Air Pollution Control—Commercial Technology, Wiley. 2002, pp. 86-89.
Aerosolgeneratoren Und-Dispergierer. accessed May 7, 2018. http://www.tsi.com/Aerosolgeneratoren-und-dispergierer/.
Pyrogenes Siliciumdioxid. Wikipedia. Accessed Nov. 16, 2018. https://de.wikipedia.org/w/index.php?title=Pyrogenes_Siliciumdioxid &oldid=182147815.
Aerosolgematoren fur Feststoffe. Accessed May 7, 2018. https://www.palas.de/de/product/aerosolgeneratorssolidparticles.
Reindichte. Wikipedia. Accessed Nov. 16, 2018. https://de.wikipedia.org/w/index.php?title=Reindichte&oldid=164022376.
Pyrogenes Siliciumdioxid. Wikipedia. accessed Nov. 16, 2018. https://de.wikipedia.org/wiki/Pyrogenes_Siliciumdioxid.
Aerosil Fumed Silica and Aeoxide Fumed Alumina for Glossy Photo Inkjet Media. Technical Information 1331. https://www.aerosil.

(56) References Cited

OTHER PUBLICATIONS com/product/aerosil/downloads/ti-1331-aerosil-and-aeroxide-for-glossy-photo-inkjet-media-en.pdf.
Fumed silica process.svg. Wikimedia Commons. Accessed Nov. 28, 2016. https://commons.wikimedia.org/w/index.php?title=File:Fumed_silica_process.svg&oldid=222460038.
Framework type AEI. Database of Zeolite Structures. accessed Apr. 10, 2018. http://europe.iza-structure.org/IZA-SC/framework.php?STC=CHA.
Framework type CHA. Database of Zeolite Structures, accessed Apr. 10, 2018. http://europe.iza-structure.org/IZA-SC/framework.php?STC=AEI.
ISO 13320: 2009(E). Particle size analysis—Laser diffraction Methods (60 pages).
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
Mathis. U., et al., TEM analysis of volatile nanoparticles from particle trap equipped diesel and direct-injection spark-ignition vehicles. Atmospheric Environment. vol. 38, pp. 4347-4355.
Albers, P., et al. Kristallin und amorph Sand als Rohstoff. [Crystalline and amorphous sand as a raw material]. Chemie in unserer Zeit, 2016, vol. 50, pp. 162-171 (in German with English translation).
Von Karman, T. Ueber den Mechanismus des Widerstandes, den ein bewegter Körper in einer Flüssigkeit erfährt [About the mechanism of resistance a moving body experiences in a liquid] Nachr. Ges. Wiss. Göttingen, Math. Phys. K1, 509 (1911); 547 (1912) (In German with English Translation).
Benard, H. Comptes rendus hebdomadaires des séances de l'Académie des sciences/ publiés . . . par MM. les secrétaires perpétuels. [Weekly reports of the sessions of the Academy of Sciences / published . . . by MM. perpetual secretaries] C. R. Acad. Sci. Paris Ser. IV 147, 839 (1908); 147, 970 (1908) (In French with English translation).
Hall, D.E., et al., Measurement of the Number of Siz Distribution of Particles Emitted from a Gasoline Direct Injection Vehicle. SAE. 1999-01-3530. pp. 1-11.
Ferkel, H., et al. Edelmetallfreie Nanokatalysatoren Für Dieselpartikelfilter [Non-Metal-Free Nanocatalysts for diesel Particulate Filters]. MTZ—Motortechnische Zeitschrift, 2010, vol. 71, pp. 128-133. In German with English translation.
Hinds, W.C. Aerosol technology: Properties, behavior and measurement of airborne particles. Wiley, $2^{nd}$ edition. 1999. 200 Pages.
Maricq, M.M., et al., Particulate Emissions from a Direct-Injection Spark-Ignition (DISI) Engine. SAE. 1999-01-1530. 1999. pp. 1-9.
ISO 11465—Soil Quality—Determination fo dry matter and water content on a mass basis—Gravimetric Method. 1993 (8 pages).
Stieß, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 in German with English translation.

\* cited by examiner

CATALYTICALLY ACTIVE PARTICLE FILTER WITH A HIGH DEGREE OF FILTRATION EFFICIENCY

The invention relates to a wall-flow filter, a method for its production and the use of the filter in the reduction of harmful exhaust gases and fine particles of an internal combustion engine.

Diesel particulate filters or gasoline particulate filters with and without an additional catalytically active coating are suitable aggregates for removing particle emissions and reducing harmful substances in exhaust gases. These are wall-flow honeycomb bodies, which are referred to as catalyst supports, carriers or substrate monoliths. In order to meet the legal standards, it is desirable for current and future applications for the exhaust gas aftertreatment of internal combustion engines to combine particulate filters with other catalytically active functionalities not only for reasons of cost but also for installation space reasons. The catalytically active coating can be located on the surface or in the walls of the channels forming this surface. The catalytically active coating is often applied to the catalyst support in the form of a suspension in a so-called coating operation. Many such processes in this respect were published in the past by automotive exhaust-gas catalytic converter manufacturers (EP1064094B1, EP2521618B1, WO10015573A2, EP1136462B1, U.S. Pat. No. 6,478,874B1, U.S. Pat. No. 4,609,563A, WO9947260A1, JP5378659B2, EP2415522A1, JP2014205108A2). The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalytic converter or oxidic catalyst materials are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters that have good catalytic activity due to an active coating and yet have the preferably low exhaust-gas back pressure. With regard to a low exhaust-gas back pressure, it has proven to be advantageous if the catalytically active coating is not present as a layer on the channel walls of a porous wall-flow filter; rather, the channel walls of the filter are instead interspersed with the catalytically active material (WO2005016497A1, JPH01-151706, EP1789190B1). For this purpose, the particle size of the catalytic coating is selected such that the particles penetrate into the pores of the wall-flow filters and can be fixed there by calcination. A disadvantage of catalytically active filters having an in-wall coating is that the amount of catalytically active substance is limited by the absorption capacity of the porous wall.

It has been found that, by applying the catalytically active substances to the surfaces of the channel walls of a wall-flow honeycomb body, an increase in the conversion of the harmful substances in the exhaust gas can be achieved. Combinations of on-wall coating and in-wall coating with catalytically active material are also possible, as a result of which the catalytic performance can be further increased without substantially increasing the back pressure.

In addition to the catalytic effectiveness, a further functionality of the filter that can be improved by a coating is its filtration efficiency, i.e., the filtering effect itself. WO 2011151711A1 describes a method by means of which a dry aerosol is applied to a non-coated or catalytically coated filter that carries the catalytic active material in the channel walls (in-wall coating with a washcoat). The aerosol is provided by the distribution of a powdery metal oxide with a high melting point and guided through the inlet side of a wall-flow filter by means of a gas stream. In this case, the individual particles having a particle size of 0.2 µm to 5 µm agglomerate to form a bridged network of particles and are deposited as a layer on the surface of the individual inlet channels passing through the wall-flow filter. The typical powder loading of a filter is between 5 g and 50 g per liter of filter volume. It is expressly pointed out that it is not desirable to obtain a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum or silicon, preferably in fiber form ranging from 1 nm to 5 µm, and have a layer thickness greater than 10 µm, typically 25 µm to 75 µm. After the coating process, the applied powder particles are calcined in a thermal process.

A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking a gas stream loaded with ceramic particles (for example, silicon carbide, cordierite) through. After application of the filter layer, the honeycomb body is fired at temperatures greater than 1000° C. in order to increase the adhesive strength of the powder layer on the channel walls. EP2502661A2 and EP2502662B1 mention further on-wall coatings by powder application.

A coating inside the pores of a wall-flow filter unit by spraying dry particles is described in U.S. Pat. No. 8,388,721 B2. In this case, however, the powder should penetrate deeply into the pores. 20% to 60% of the surface of the wall should remain accessible to soot particles, thus open. Depending on the flow velocity of the powder/gas mixture, a more or less steep powder gradient between the inlet and outlet sides can be set. The pores of the channel walls of the filter coated with powder in the pores according to U.S. Pat. No. 8,388,721B2 can subsequently be coated with a catalytically active component. Here as well, the catalytically active material is located in the channel walls of the filter.

The introduction of the powder into the pores, for example by means of an aerosol generator, is also described in EP2727640A1. Here, a non-catalytically coated wall-flow filter is coated using a gas stream containing, for example, aluminum oxide particles in such a way that the complete particles, which have a particle size of 0.1 µm to 5 µm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. They fill in 10% to 50% of the volume of the filled pores in the channel walls. This filter, both loaded with soot and without soot, has an improved filtration efficiency compared to the untreated filter together with a low exhaust-gas back pressure of the soot-loaded filter.

In WO2018115900A1, wall-flow filters are coated with an optionally dry synthetic ash in such a way that a continuous membrane layer is formed on the walls of the optionally catalytically coated wall-flow filter.

All patents listed in this prior art have the aim of increasing the filtration efficiency of a filter by coating the filter with a powder. The filters optimized in this way with regard to filtration efficiency can also carry a catalytically active coating in the porous channel walls before the powder coating. However, there are no indications in any of the examples to simultaneously optimize the catalytic effect of a filter and increase filtration efficiency. Therefore, there continues to be a need for particulate filters with which both catalytic activity and filtration efficiency are optimized with respect to exhaust-gas back pressure.

The object of the present invention is to specify a corresponding particulate filter with which a sufficient filtration efficiency is coupled with the lowest possible increase in the exhaust-gas back pressure and a high catalytic activity.

These and other objects that are obvious from the prior art are achieved by the specification of a particulate filter according to claims 1 to 13. Claims 14 to 16 are aimed at the production of a particulate filter according to the invention. Claim 17 aims at using the particulate filter for the exhaust-gas aftertreatment of internal combustion engines.

The present invention relates to a wall-flow filter for removing particles from the exhaust gas of internal combustion engines, wherein such wall-flow filter has a length L and at least one catalytically active coating Y and/or Z and channels E and A, which extend in parallel between a first and a second end of the wall-flow filter and are separated by porous walls, and form the surfaces $O_E$ or $O_A$, and wherein the channels E are closed at the second end and the channels A are closed at the first end. The object posed is very surprisingly achieved in that in such a wall-flow filter, the coating Y is located in the channels E on the walls of the surfaces $O_E$, wherein the coating on the walls of the surface $O_E$ extends from the first end of the wall-flow filter to a length of less than the length L, and the coating Z is located in the channels A on the walls of the surfaces $O_A$, wherein the coating on the walls of the surface $O_A$ extends from the second end of the wall-flow filter to a length of less than the length L, and wherein the inlet region E of the filter has additionally been impinged with at least one dry powder-gas aerosol. Impinging a wall-flow filter that is conventionally zone-coated using wet techniques (as described in U.S. Pat. No. 8,794,178, for example) and in which the catalytically active coating is located on the surface of the channel walls and that is coated after drying and/or calcination with a dry powder-gas aerosol, results in a wall-flow filter with extremely good filtration efficiency and only slightly increased exhaust-gas back pressure and simultaneously excellent catalytic activity.

The filters described herein, which are catalytically coated and then impinged with powder, differ from those that are produced in the exhaust system of a vehicle by ash deposition during operation. According to the invention, the catalytically active filters are deliberately powder-sprayed with a specific, dry powder. As a result, the balance between filtration efficiency and exhaust-gas back pressure can be adjusted selectively right from the start. Wall-flow filters with which undefined ash deposits have, for example, resulted from fuel combustion in the cylinder during driving operation or by means of a burner are therefore not included in the present invention.

All ceramic materials customary in the prior art can be used as wall-flow monoliths or wall-flow filters. Porous wall-flow filter substrates made of cordierite, silicon carbide or aluminum titanate are preferably used. These wall-flow filter substrates have inflow and outflow channels, wherein the respective downstream ends of the inflow channels and the upstream ends of the outflow channels are offset against each other and closed off with gas-tight "plugs." In this case, the exhaust gas that is to be purified and that flows through the filter substrate is forced to pass through the porous wall between the inflow channel and outflow channel, which brings about a particulate filtering effect. The filtration property for particulates can be designed by means of porosity, pore/radii distribution, and thickness of the wall. The porosity of the uncoated wall-flow filters is typically more than 40%, generally from 40% to 75%, particularly from 50% to 70% [measured according to DIN 66133, latest version on the date of application]. The average pore size of the uncoated filters is at least 7 μm, for example from 7 μm to 34 μm, preferably more than 10 μm, in particular more preferably from 10 μm to 25 μm or very preferably from 15 μm to 20 μm [measured according to DIN 66134, latest version on the date of application]. The completed (catalytically coated) filters with a pore size of typically 10 μm to 20 μm and a porosity of 50% to 65% are particularly preferred.

The catalytic coatings Y and Z of the wall-flow filter to be impinged with the powder do not extend over the entire length of the wall-flow filter. The coatings Y and/or Z (if present) are preferably located starting from the respective end of the wall-flow filter to a length of up to 90% of the length L. The minimum length of the coatings Y and Z, if present, is at least 1.25 cm, preferably at least 2.0 cm and very preferably at least 2.5 cm, as calculated from the respective end of the filter. However, the coatings Y and Z, if present, are each located on the surfaces $O_E$ and/or $O_A$. These so-called on-wall coatings are preferably from 10 to 90% of the length L of the wall-flow filter, preferably 30 to 80%, and particularly preferably 60 to 80%, as calculated from the respective end of the wall-flow filter. The term "on-wall coating" means that these coatings rise above the surfaces $O_E$ and $O_A$ into the channels E and A of the wall-flow filter, respectively, and consequently reduce the channel cross section. The superficial pores of the surfaces $O_E$ and $O_A$ are only secondarily filled with the catalytically active material. More than 80%, preferably more than 90%, of the catalytically active material is not located in the porous wall of the channels E and A.

In a further preferred embodiment, the coating Y and/or Z (if present) has a thickness gradient over the length L such that the least thickness of the coating Y and/or Z prevails at the respective ends of the wall-flow filter. Consequently, the thickness increases along the length L of the wall-flow filter (see FIG. 3). In this case, such coatings may preferably have more than 2 times, more preferably up to more than 3 times, the thickness at one coating end than at the other coating end. In this case, the thickness is the height at which the coating Y and/or Z rises above the surface $O_E$ or $O_A$. The thickness gradient of the coating on the channel walls also makes it possible for the filtration efficiency to be adjusted over the entire length L of the filter. The result is a more uniform deposition of the soot over the entire filter wall and thus an improved exhaust-gas back pressure increase and possibly a better burn-off of the soot.

In addition to the catalytically active coatings Y and Z, the wall-flow filter according to the invention can have a further coating X located in its walls and extending from the first or second end of the wall-flow filter to a length of up to 100% of the length L. The minimum of such in-wall coating is at least 1.25 cm, preferably at least 2.0 cm and very preferably at least 2.5 cm, as calculated from the respective end of the filter. The coating X preferably extends over up to 80% of the length L.

Accordingly, the wall-flow filter, which is impinged upon according to the invention with the powder-gas aerosol, already contains within itself a catalytic activity (referred to herein as X, Y and Z). Here, catalytic activity is understood to mean the ability to convert harmful constituents of the exhaust gas from internal combustion engines into less harmful ones. The exhaust gas constituents NOx, CO and HC or the particulate burn-off should be mentioned here in particular. Such catalytic activity is provided according to the requirements of the person skilled in the art by a coating of the wall-flow filter in its walls and/or on its walls with a catalytically active material. The term "coating" is accordingly to be understood to mean the application of catalytically active materials to a wall-flow filter. The coating assumes the actual catalytic function. In the present case, the coating is carried out by applying a correspondingly low-viscosity aqueous suspension of the catalytically active components, also referred to as a washcoat, into or onto the wall of the wall-flow filter, e.g., in accordance with EP1789190B1. After application of the suspension, the wall-flow filter is dried and, if applicable, calcined at an increased temperature. The catalytically coated filter preferably has a loading of 20 g/l to 200 g/l, preferably 30 g/l to 150 g/l. The most suitable amount of loading of a filter coated in the wall depends on its cell density, its wall thickness, and the porosity.

In principle, all coatings known to the person skilled in the art for the automotive exhaust-gas field along with combinations thereof are suitable for the present invention. The catalytically active coating of the filter can preferably be selected from the group consisting of three-way catalyst, SCR catalyst, nitrogen oxide storage catalyst, oxidation catalyst, soot-burn-off coating. With regard to the individual catalytic functions coming into consideration and their explanation, reference is made to the statements in WO2011151711A1.

Particular preference is given to coatings (for X, Y and/or Z) that have a three-way functionality and are active in particular at operating temperatures of 250 to 1100° C. They usually contain one or more noble metals, which are fixed on one or more carrier materials, along with one or more oxygen storage components. Platinum, palladium and rhodium are particularly suitable as precious metals, wherein palladium, rhodium or palladium and rhodium are preferred and palladium and rhodium are particularly preferred. Based on the particulate filter according to the invention, the proportion of rhodium in the entire noble metal content is in particular greater than or equal to 10% by weight. The noble metals are usually used in quantities of 0.15 to 5 g/l based on the volume of the wall-flow filter.

As carrier materials for the precious metals, all materials familiar to the person skilled in the art for this purpose can be considered. Such materials are in particular metal oxides with a BET surface area of 30 to 250 $m^2/g$, preferably 100 to 200 $m^2/g$ (determined according to DIN 66132—latest version as of filing date). Particularly suitable carrier materials for the precious metals are selected from the series consisting of aluminum oxide, doped aluminum oxide, silicon oxide, titanium dioxide and mixed oxides of one or more of these. Doped aluminum oxides are, for example, aluminum oxides doped with lanthanum oxide, zirconium oxide and/or titanium oxide. Lanthanum-stabilized aluminum oxide is advantageously used, wherein lanthanum is used in quantities of 1 to 10% by weight, preferably 3 to 6% by weight, in each case calculated as $La_2O_3$ and based on the weight of the stabilized aluminum oxide. Another suitable carrier material is lanthanum-stabilized aluminum oxide the surface of which is coated with lanthanum oxide, with barium oxide or with strontium oxide.

Cerium/zirconium/rare earth metal mixed oxides are particularly suitable as the oxygen storage component. The term, "cerium/zirconium/rare-earth metal mixed oxide," within the meaning of the present invention excludes physical mixtures of cerium oxide, zirconium oxide, and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide (fixed solution). Depending on the manufacturing process, however, not completely homogeneous products may arise which can generally be used without any disadvantage. In all other respects, the term "rare earth metal" or "rare earth metal oxide" within the meaning of the present invention does not include cerium or cerium oxide. Lanthanum oxide, yttrium oxide, praseodymium oxide, neodymium oxide and/or samarium oxide can, for example, be considered as rare earth metal oxides in the cerium/zirconium/rare earth metal mixed oxides. Lanthanum oxide, yttrium oxide and/or praseodymium oxide are preferred.

Lanthanum oxide and/or yttrium oxide are particularly preferred, and lanthanum oxide and yttrium oxide, yttrium oxide and praseodymium oxide, and lanthanum oxide and praseodymium oxide are more particularly preferred. In embodiments of the present invention, the oxygen storage components are free of neodymium oxide. In accordance with the invention, the cerium oxide to zirconium oxide mass ratio in the cerium/zirconium/rare earth metal mixed oxides can vary within wide limits. It is, for example, 0.1 to 1.5, preferably 0.2 to 1 or 0.3 to 0.5.

If the cerium/zirconium/rare earth metal mixed oxides contain yttrium oxide as a rare earth metal, the proportion thereof is in particular 5 to 15% by weight based on the oxygen storage material. If the cerium/zirconium/rare earth metal mixed oxides contain praseodymium oxide as a rare earth metal, the proportion thereof is in particular 2 to 10% by weight based on the oxygen storage material. If the cerium/zirconium/rare earth metal mixed oxides contain lanthanum oxide and yttrium oxide as a rare earth metal, the mass ratio thereof is in particular 0.1 to 1. If the cerium/zirconium/rare earth metal mixed oxides contain lanthanum oxide and praseodymium oxide as a rare earth metal, the mass ratio thereof is in particular 0.1 to 1. The coatings Y, Y' and Z usually contain oxygen storage components in quantities of 15 to 120 g/l, based on the volume of the wall-flow filter. The mass ratio of carrier materials and oxygen storage components in the coatings X, Y and Z (if present) is usually 0.3 to 1.5, for example 0.4 to 1.3.

In embodiments of the present invention, the coatings X and Y along with Z (if present) comprise lanthanum-stabilized aluminum oxide, rhodium, palladium or palladium and rhodium, and an oxygen storage component comprising zirconium oxide, cerium oxide, yttrium oxide and lanthanum oxide. In other embodiments of the present invention, the coatings X and Y along with Z (if present) comprise lanthanum-stabilized aluminum oxide, rhodium, palladium or palladium and rhodium, and an oxygen storage component comprising zirconium oxide, cerium oxide, praseodymium oxide and lanthanum oxide.

In embodiments of the present invention, the sum of the lengths of coating Y and coating Z, if present, is preferably 110 to 160% of the length L. In another preferred embodiment, the sum of the lengths of coating X and coating Z, if present, is preferably 90 to 50% of the length L. In embodiments of the present invention, the coatings X, Y and Z contain no zeolite and no molecular sieve.

The composition of the particular coating and the type of coating (in-wall or on-wall) along with the amount of catalytic coatings applied can be varied and combined with regard to the desired catalytic activity. The above-described variation of the catalytically active coating creates different wall permeabilities in the filter. In addition, as a result of production, the catalytic layers on the filter walls sometimes have inhomogeneities, small cracks, different layer thicknesses and partly also uncoated defects, and although they have a high catalytic activity and an acceptable back pressure, they have a relatively low fresh filtration efficiency. The regions which have only an in-wall coating X or no catalytic coating may also have a lower filtration efficiency. All of this has the result that the channel walls are gas-permeable to different extents and can have regions with different gas permeability.

Impinging the wall-flow filter considered here with the dry powder-gas aerosol thus leads to the powder particles, following the flow of the gas, depositing on the surface of the input side of the filter and possibly in the pores of the filter. In the process, the aforementioned different wall permeability of the filter (e.g., due to inhomogeneities of the filter wall itself or different coating zones) leads to a selective deposition of the powder on the filter wall or in the pores of the wall where the flow is the greatest. This effect also results in, for example, cracks or pores in the washcoat layer being filled up by the porous powder due to coating defects, such that the soot particles in the exhaust gas are later increasingly retained as the exhaust gas passes through the filter. A better filtration efficiency is consequently the result.

According to the invention, the zone-coated, dry exhaust-gas filter is thus coated in the exhaust-gas flow direction with a powder in such a way that the cell wall regions with the highest flow-through are coated by loose, intrinsically porous powder accumulations in the pores and/or also on the wall in order to obtain a desired increased filtration efficiency. In the process, the formation of the intrinsically porous powder accumulations surprisingly leads to a relatively low increase in back pressure. In a preferred embodiment, the wall-flow filter is impinged with a powder-gas aerosol such that during impinging, the powder deposits on the channel walls of the input side and builds up a cohesive layer there. In a further quite preferred embodiment, the wall-flow filter is impinged with a powder-gas aerosol such that during impinging, the powder precipitates in the pores of the filter walls and fills them as far as the input surface and thereby does not form a cohesive layer on the walls of the filter.

The amount of powder used depends on the type of powder, the type of coating (see just above) and optionally the volume of the available pores and can be determined by the person skilled in the art in preliminary experiments under the given boundary conditions (an exhaust-gas back pressure that is not too high). As a rule, the loading of the filter with the powder is no more than 50 g/l based on the filter volume. The value is preferably not more than 20 g/l, very particularly preferably not more than 10 g/l. A lower limit is naturally formed by the desired increase in filtration efficiency. The exact amount of powder needed to increase filtration efficiency is determined depending on the length and type of the catalytic coating. If only one powder coating is desired in the surface pores of the filter, an amount of powder of up to 10 g/l, preferably up to 5 g/l, is advantageously sufficient under the stated conditions.

Powders which are preferably used in the present invention for producing the aerosol are sufficiently familiar to the person skilled in the art. These are generally high-melting metal compounds, which are commonly used as support materials for catalysts in the automotive exhaust-gas field. Corresponding metal oxide, metal sulfate, metal phosphate, metal carbonate or metal hydroxide powders or their mixtures are preferably used. Possible metals for the metal compounds are in particular those selected from the group of alkali metals, alkaline earth metals or earth metals, or transition metals. Such metals selected from the group of calcium, magnesium, strontium, barium, aluminum, silicon, titanium, zirconium, cerium are preferably used. As stated, these metals can preferably be used as oxides. Very particular preference is given to the use of cerium oxide, titanium dioxide, zirconium dioxide, silicon dioxide, aluminum oxide, iron oxide, zinc oxide or mixtures or mixed oxides thereof. Very particular preference is given to the use of an aerosol which is a mixture of air and one of these metal oxide powders. Here, the term "mixed oxide" (solid solutions of a metal oxide in at least one other) is also understood to mean the use of zeolites and zeotypes. In the context of the invention, zeolites and zeotypes are defined as in WO2015049110A1.

In addition to the usually chemically precipitated metal oxides, so-called pyrogenic metal oxide powders can also be used. In general, pyrogenically produced metal oxide powders are understood to be those obtained by flame hydrolysis or flame oxidation from a metal oxide precursor in an oxyhydrogen gas flame (https://de.wikipedia.org/w/index.php?title=Pyrogenes_Siliciumdioxid&oldid=182147815; Pater Albers et al., Chemie in unserer Zeit [Chemistry in our Time], 2016, 50, 162-171; Hans Ferkel et al., MTZ—Motortechnische Zeitschrift [Motor Engineering Journal], 2010, 71, 128-133). Such powders have properties as described for flame-synthesized particulate products in the following references: Gutsch et al. (2002) KONA (no. 20); Li S. et al. (2016) Progress in Energy and Combustion Science (55); Ulrich G. (1971) Combustion Science and Technology (vol. 4). Pyrogenic metal oxides are generally characterized by a high specific surface area and a low bulk density. Generally, large-surface oxides of different metals can be produced by means of this method. Such oxides are advantageously produced from the group of metals consisting of silicon, aluminum, titanium, zirconium, cerium or mixtures of such metals.

So that the powder of the powder-gas aerosol can, for example, deposit sufficiently well in the pores of the catalytically coated wall-flow filter or adhere sufficiently well to the filter wall, the particle diameter in the aerosol should be at least smaller than the pores of the wall-flow filter. This can be expressed by the ratio of the average particle diameter ($Q_3$ distribution, measured according to the most recent ISO 13320 on the date of application) d50 in the dry aerosol and the average pore diameter of the wall-flow filter after coating (measured according to DIN 66134, latest version on the date of application) being between 0.03-2, preferably between 0.05-1.43 and very particularly preferably between 0.05-0.63. As a result, the particles of the powder in the aerosol, following the gas flow, can precipitate in the pores of the walls of the wall-flow filter.

The powders should advantageously be fixed to the carrier without prior or subsequent treatment. For a powder suitable for producing the filters according to the invention, an optimization between the largest possible surface area of the powder used, the crosslinking and the adhesive strength is advantageous. During operation in the vehicle, small particles follow the flow lines approximately without inertia due to their low particle relaxation time. A random "trembling movement" is superimposed on this even, convection-driven movement. Following this theory, the largest possible flowed-around surfaces should be provided for a good filtration effect of a filter impinged with powder. The powder should therefore have a high proportion of fines, since with the same total volume of oxide, small particles offer significantly larger surfaces. At the same time, however, the pressure loss must only increase insignificantly. This requires a loose crosslinking of the powder. For a filtration efficiency-enhancing coating, it is preferable to use powders having a tapped density of between 50 g/l and 900 g/l, preferably between 200 g/l and 850 g/l and very preferably between 400 g/l and 800 g/l.

According to the invention, the powders can be used as such as described above. However, the use of dry powder which supports a catalytic activity with regard to exhaust-gas aftertreatment is also conceivable. Accordingly, the powder itself can likewise be catalytically active with regard to reducing harmful substances in the exhaust gas of an internal combustion engine. Suitable for this purpose are all activities known to the person skilled in the art, such as TWC, DOC, SCR, LNT or soot-burn-off-accelerating catalysts. The powder will generally have the same catalytic activity as an optional catalytic coating of the filter. This further increases the overall catalytic activity of the filter as compared to filters not coated with catalytically active powder. In this respect, it may be possible to use aluminum oxide impregnated with a noble metal for producing the powder-gas aerosol, for example. It is also possible to apply two or more powders of different composition and functionality as dry powder-gas aerosol in two or more successive coating steps.

In this connection, preference is given to three-way activity of the powder applied as an aerosol with activation including palladium and rhodium along with an oxygen storage material, such as cerium zirconium oxide. It is likewise conceivable for catalytically active material to be used for the SCR reaction. Here, the powder may consist, for example, of zeolites or zeotypes exchanged with transition metal ions. The use of iron-exchanged and/or copper-exchanged zeolites is very particularly preferred; extremely preferred as material for producing the powder-gas aerosol is CuCHA (copper-exchanged chabazite; http://europe.iza-structure.org/IZA-SC/framework.php?STC=CHA) or CuAEI (http://europe.iza-structure.org/IZA-SC/framework.php?STC=AEI).

A further advantage is a powder whose catalytic activity leads to improved soot combustion. A powder consisting of an aluminum oxide impregnated with one or more noble metals is preferred. Preferred noble metals in this case are platinum, palladium, rhodium or mixtures thereof. Particularly preferred is an aluminum oxide impregnated with platinum and palladium. Further materials catalyzing soot burn-off are pure or doped cerium oxides and/or cerium/zirconium mixed oxides. Doping elements known to the person skilled in the art are those from the group of rare earth metals, such as lanthanum, yttrium, neodymium, praseodymium. Further known elements catalyzing soot burn-off are derived from the group of alkali metals, alkaline earth metals and transition metals, such as magnesium, calcium, iron, copper, manganese. Such metals can be applied to the filter either directly in powder form, e.g., as sulfate, carbonate, oxide or analogous compounds, or as a composite in conjunction with aluminum oxide, cerium oxide and/or cerium/zirconium mixed oxide.

It should be particularly pointed out that the filters described herein, which are impinged with powder, differ from those that are produced in the exhaust system of a vehicle as a result of ash deposition during operation. According to the invention, the filters are deliberately coated with various specific, dry powders. As a result, the balance between filtration efficiency, catalytic activity and exhaust-gas back pressure can be deliberately adjusted for the intended purpose (diesel soot, gasoline engine soot) right from the start.

The present invention also provides a method for producing a wall-flow filter according to the invention. In principle, the person skilled in the art knows how to produce an aerosol from a powder and a gas in order to then guide the aerosol through the filter which is to be impinged by the powder. In order to produce a wall-flow filter for reducing the harmful substances in the exhaust gas of an internal combustion engine, a dry filter provided with a catalytically active coating and having regions of different permeability is impinged according to the invention with powder-gas aerosols on the input side. The filter is impinged with the powder-gas aerosol by dispersing the powder in a gas, which is then fed to a gas stream and is subsequently sucked through the filter on the input side.

The aerosol consisting of the gas and the powder may be produced in accordance with the requirements of the person skilled in the art or as illustrated below. For this purpose, a powder is usually mixed with a gas (http://www.tsi.com/Aerosolgeneratoren-und-dispergierer/; https://www.pal-as.de/de/product/aerosolgeneratorssolidparticles). This mixture of gas and powder produced in this way is then advantageously fed into the inlet side of the wall-flow filter via a gas stream. The term "inlet side" refers to the portion of the filter formed by the inflow channels/input channels. The input surface is formed by the wall surfaces of the inflow channels/input channels on the input side of the wall-flow filter. The same applies mutatis mutandis to the outlet side.

All gases considered by the person skilled in the art for the present purpose can be used as gases for producing the aerosol and for inputting into the filter. The use of air is most particularly preferred. However, it is also possible to use other reaction gases which can develop either an oxidizing (e.g., $O_2$, $NO_2$) or a reducing (e.g., $H_2$) activity with respect to the powder used. With certain powders, the use of inert gases (e.g., $N_2$) or noble gases (e.g., He) may also prove advantageous. Mixtures of the listed gases are also conceivable.

In order to be able to deposit the powder to a sufficient depth into the inlet region E and with good adhesion, a certain suction power is needed. In orientation experiments for the respective filter and the respective powder, the person skilled in the art can form an idea for himself in this respect. It has been found that the aerosol (powder/gas mixture) is preferably sucked through the filter at a rate of 5 m/s to 60 m/s, more preferably 10 m/s to 50 m/s and very particularly preferably 15 m/s to 40 m/s. This likewise achieves an advantageous adhesion of the applied powder.

Dispersion of the powder in the gas for establishing a powder-gas aerosol takes place in various ways. Preferably, the dispersion of the powder is generated by at least one or a combination of the following measures: compressed air, ultrasound, sieving, "in situ milling," blowers, expansion of gases, fluidized bed. Further dispersion methods not mentioned here can likewise be used by the person skilled in the art. In principle, the person skilled in the art is free to select a method for producing the powder-gas aerosol. As just described, the powder is first converted into a powder-gas aerosol by dispersion and then fed into a gas stream.

This mixture of gas and powder thus produced is only subsequently introduced into an existing gas stream, which carries the finely distributed powder into the inlet side E of the wall-flow filter. This process is preferably assisted by a suction device, which is positioned in the pipeline downstream of the filter. This is in contrast to the device shown in FIG. 3 of U.S. Pat. No. 8,277,880B, with which the powder-gas aerosol is produced directly in the gas stream. The method according to the invention allows a much more uniform and good mixing of the gas stream with the powder-gas aerosol, which ultimately ensures an advantageous distribution of the powder particles in the filter in the radial and axial directions and thus helps to make uniform and control the deposition of the powder particles on the input surface of the filter. The powder is dry when the wall-flow filter is impinged within the meaning of the invention. The powder is preferably mixed with ambient air and applied to the filter. By mixing the powder-gas aerosol with particle-free gas, preferably dry ambient air, the concentration of the particles is reduced to such an extent that no appreciable agglomeration takes place until deposition in the wall-flow filter. This preserves the particle size in the aerosol adjusted during the dispersion.

A preferred device for producing a wall-flow filter according to the invention is schematically illustrated in FIG. 12. Such a device is characterized in that it comprises
- at least one unit for dispersing powder in a gas;
- a unit for mixing the dispersion with an existing gas stream;
- at least two filter-receiving units designed to allow the gas stream to flow through the filter without further supply of a gas;
- a suction-generating unit that maintains the gas stream through the filter;
- optionally, a unit for generating vortices upstream of the filter, so that a deposition of powder on the input plugs of the filter is prevented as far as possible; and
- optionally, one unit through which at least a partial gas stream is extracted downstream of the suction device and added before the powder addition to the gas stream that is sucked through the filter.

In a preferred embodiment of the method according to the invention, as shown in the drawing of FIG. 12, at least a partial gas stream is extracted downstream of the suction device and added before the powder addition back to the gas stream that is sucked through the filter. The powder is thereby metered into an already heated air stream. The suction blowers for the necessary pressures generate approximately 70° C. exhaust air temperature since the installed suction power is preferably >20 kW. In an energetically optimized manner, the waste heat of the suction blower is used to heat the supply air in order to reduce the relative humidity of the supply air. This in turn reduces the adhesion of the particles to one another and to the input plugs. The deposition process of the powder can thus be better controlled.

In the present method for producing a wall-flow filter, a gas stream is loaded with a powder-gas aerosol and sucked into a filter. This ensures that the powder can be distributed sufficiently well in the gas stream for it to be able to penetrate into the inlet channels of the filter on the inlet side of the wall-flow filter. Homogeneous distribution of the powder in the gas/air requires intensive mixing. For this purpose, diffusers, venturi mixers and static mixers are known to the person skilled in the art. Particularly suitable for the powder coating process are mixing devices that avoid powder deposits on the surfaces of the coating system. Diffusers and venturi tubes are thus preferably used for this process. The introduction of the dispersed powder into a fast-rotating rotating flow with a high turbulence has also proven effective.

In order to achieve an advantageously uniform distribution of the powder over the cross section of the filter, the gas transporting the powder should have a piston flow (if possible, the same velocity over the cross section) when impinging on the filter. This is preferably set by an accelerated flow upstream of the filter. As is known to the person skilled in the art, a continuous reduction of the cross section without abrupt changes causes such an accelerated flow, described by the continuity equation. Furthermore, it is also known to the person skilled in the art that the flow profile is thus more closely approximated to a piston profile. For the targeted change of the flow, built-in components, such as sieves, rings, disks, etc. below and/or above the filter can be used.

In a further advantageous embodiment of the present method, the apparatus for powder coating has one or more devices (turbulators, vortex generators) with which the gas stream carrying the powder-gas aerosol can be vortexed prior to impinging on the filter. As an example in this respect, corresponding sieves or grids can be used, which are placed at a sufficient distance upstream of the filter. The distance should not be too large or small so that sufficient vortexing of the gas stream directly upstream of the filter is achieved. The person skilled in the art can determine the distance in simple experiments. The advantage of this measure is explained by the fact that powder constituents do not deposit on the inlet plugs of the outlet channels and all the powder can penetrate into the input channels. Accordingly, it is preferred according to the invention if the powder is vortexed before flowing into the filter in such a way that deposits of powder on the inlet plugs of the wall-flow filter are avoided as far as possible. A turbulator or turbulence or vortex generator in aerodynamics refers to equipment which causes an artificial disturbance of the flow. As is known to the person skilled in the art, vortices (in particular microvortices) form behind rods, gratings, and other flow-interfering built-in components at corresponding Re numbers. Known is the Karman vortex street (H. Benard, C. R. Acad. Sci. Paris. Ser. IV 147, 839 (1908); 147, 970 (1908); T. von Karman, Nachr. Ges. Wiss. Gottingen, Math. Phys. KI. 509 (1911); 547 (1912)) and the wake turbulence behind airplanes which can cover roofs. In the case according to the invention, this effect can be intensified very particularly advantageously by vibrating self-cleaning sieves (so-called ultrasonic screens) which advantageously move in the flow. Another method is the disturbance of the flow through sound fields, which excites the flow to turbulences as a result of the pressure amplitudes. These sound fields can even clean the surface of the filter without flow. The frequencies may range from ultrasound to infrasound. The latter measures are also used for pipe cleaning in large-scale technical plants.

The preferred embodiments for the wall-flow filter apply mutatis mutandis also to the method. Reference is explicitly made in this respect to what was said above about the wall-flow filter.

The present invention also relates to the use of a wall-flow filter according to the invention for reducing harmful exhaust gases of an internal combustion engine. In principle, all catalytic exhaust-gas aftertreatments (see above) coming into consideration for this purpose to the person skilled in the art and having a filter can serve for application purposes, but in particular those with which the filter is in an exhaust system together with one or more catalytically active aggregates selected from the group consisting of nitrogen oxide storage catalysts, SCR catalysts, three-way catalysts and diesel oxidation catalysts. The filter according to the invention is particularly advantageously used in combination with a three-way catalyst, in particular on its downstream side. It is particularly advantageous if the filter itself is a three-way catalytically active filter. The filters produced by the method according to the invention, optionally coated with catalytically active powder, are suitable for all these applications. The use of the filters according to the invention for the treatment of exhaust gases of a stoichiometrically operated internal combustion engine is preferred. The preferred embodiments described for the wall-flow filter according to the invention also apply mutatis mutandis to the use mentioned here.

The requirements applicable to gasoline particulate filters differ significantly from the requirements applicable to diesel particulate filters (DPF). Diesel engines without DPF can have up to ten times higher particle emissions, based on the particle mass, than gasoline engines without GPF (Maricq et al., SAE 1999-01-01530). In addition, there are significantly fewer primary particles in the case of gasoline, engines and the secondary particles (agglomerates) are significantly smaller than in diesel engines. Emissions from gasoline engines range from particle sizes of less than 200 nm (Hall et al., SAE 1999-01-3530) to 400 nm (Mathis et al., Atmospheric Environment 38 4347) with a maximum in the range of around 60 nm to 80 nm. For this reason, the nanoparticles in the case of GPF must mainly be filtered by diffusion separation. For particles smaller than 300 nm, separation by diffusion (Brownian molecular motion) and electrostatic forces becomes more and more important with decreasing size (Hinds, W.: Aerosol technology: Properties and behavior and measurement of airborne particles. Wiley, 2nd edition 1999).

Dry in the sense of the present invention accordingly means exclusion of the application of a liquid, in particular water. In particular, the production of a suspension of the powder in a liquid for spraying into a gas stream should be avoided. A certain moisture content may possibly be tolerable both for the filter and for the powder, provided that achieving the objective, the most finely distributed deposition of the powder possible in or on the input surface, is not negatively affected. As a rule, the powder is free-flowing and dispersible by energy input. The moisture content of the powder or of the filter at the time of application of the powder should be less than 20%, preferably less than 10% and very particularly preferably less than 5% (measured at 20° C. and normal pressure, ISO 11465, latest version on the date of application).

The wall-flow filter produced according to the invention and catalytically coated exhibits an excellent filtration efficiency with only a moderate increase in exhaust-gas back pressure as compared to a wall-flow filter in the fresh state that has not been impinged by powder. The wall-flow filter according to the invention preferably exhibits an improvement in soot particle deposition (filtering effect) in the filter of at least 5%, preferably at least 10% and very particularly preferably at least 20% at a relative increase in the exhaust-gas back pressure of the fresh wall-flow filter of at most 40%, preferably at most 20% and very particularly preferably at most 10% as compared to a fresh filter coated with catalytically active material but not treated with powder. As stated, in a very preferable embodiment, the powder deposits only into the open pores of the filter and forms a porous matrix there. The slight increase in back pressure is probably due to the cross section of the channels on the input side not being significantly reduced by impinging, according to the invention, the filter with a powder. It is assumed that the powder in itself forms a porous structure, which is believed to have a positive effect on the back pressure. For this reason, a filter according to the invention should also exhibit better exhaust-gas back pressure than those of the prior art, with which a powder was deposited on the walls of the inlet side of a filter or a traditional coating using wet techniques was chosen.

Since the wall-flow filter, which contains one or more zoned catalytic coatings on the surfaces of the channel walls, is provided for reducing the harmful substances in the exhaust gas of an internal combustion engine, wherein the dry filter was deliberately impinged on its input surface with a dry powder-gas aerosol, which advantageously respectively has at least one compound with a high melting point, an extremely successful solution to the object posed is achieved. The invention is explained in more detail with reference to some examples and figures.

FIG. 1 shows a light microscopy image of a filter impinged with powder. The photograph shows a top view of a plurality of channel walls in a region of the filter where no catalytically active on-wall layer is located. The powder is selectively deposited in the pores of the wall and fills them.

FIGS. 2-8 show different coating arrangements in catalytically active particulate filters according to the invention. The following designations are used therein:

(E) the input channel/inflow channel of the filter
(A) the output channel/outflow channel of the filter
(L) the length of the filter wall
(X) catalytic in-wall coating
(Y) and (Z) catalytic on-wall coating
(P) regions of the filter wall impinged with powder FIG. 2 schematically shows a filter which has on the inlet side (Y) and outlet side (Z) one zone each of an on-wall layer with a zone length of approx. 60% of the total length and is impinged with powder (P) at the end in the uncoated part of the inlet channel (E).

FIG. 3 shows the same structure of the filter as FIG. 2, with the difference that the two on-wall layers (Y, Z) have a coating gradient from the end faces toward the center of the carrier.

FIG. 4 shows a filter with an on-wall layer (Y) in the inlet region E, which is impinged with a powder (P) in the inlet channel (E).

FIG. 5 shows a filter with an on-wall layer (Z) in the outlet region A and a zone with an in-wall coating (X), with which the powder (P) precipitates in the region of highest permeability.

FIG. 6 shows a filter with which the walls of the channels are completely activated with an in-wall coating (X) and which on the inlet side (E), has a zone with an on-wall layer (Y) and was impinged with powder (P).

FIG. 7 shows the same filter as FIG. 5, but without catalytically active in-wall coating (X).

FIG. 8 shows schematically a filter with an on-wall layer each in the input channel (Y) and output channel (Z) with a length of approximately 30% of the total length L and a region in the input channel (E) impinged with powder (P).

FIG. 9 shows the results of the investigations on the filtration effect of all described particulate filters according to the invention and particulate filters according to the prior art.

Figure 12:
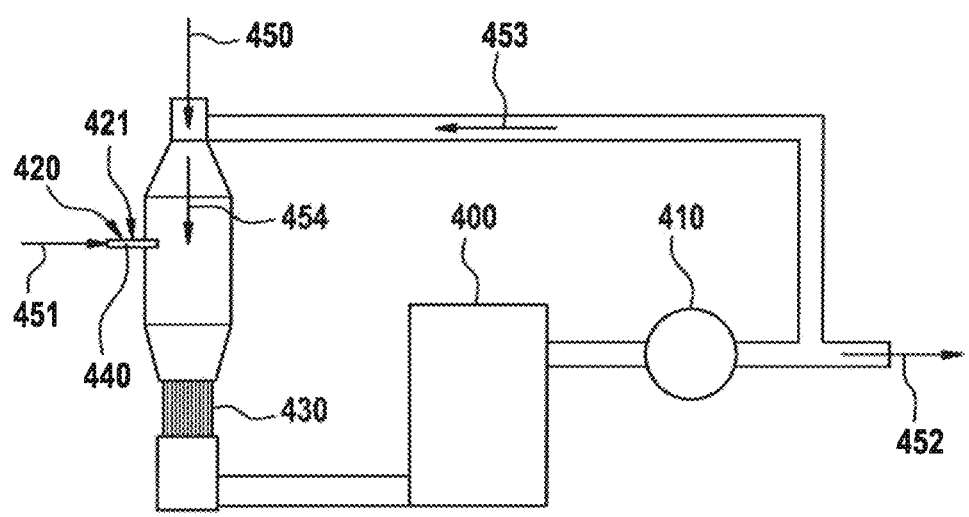

FIG. 12 shows a schematic drawing of an advantageous device for impinging the filters with a powder. Together with the gas, the powder 420 or 421 is mixed with the gas stream 454 under pressure 451 by the atomizer nozzle 440 in the mixing chamber and then sucked or pushed through the filter 430. The particles that passed through are filtered out in the exhaust gas filter 400. The blower 410 provides the necessary volumetric flow. The exhaust gas is divided into an exhaust gas 452 and a warm cycle gas 453. The warm cycle gas 453 is mixed with the fresh gas 450.

EXAMPLES

Producing and Testing the Particulate Filters

Conventional high-porosity cordierite filters having a round cross section were used to produce the catalytically active particulate filters described in examples and comparative examples. The wall-flow filter substrates had a cell density of 46.5 cells per square centimeter at a cell wall thickness of 0.22 mm. They had a porosity of 65% and an average pore size of 18 μm.

In Comparative Example 1, a coating suspension was applied in the outflow channels. In Comparative Example 2, coating suspensions were applied in two steps in the inflow channels and outflow channels. The filter described in Comparative Example 3 contains both a coating arranged in the wall and a coating suspension applied in the inflow channels. After the application of each coating suspension, the wall-flow filters were dried and calcined at 500° C. for the duration of 4 hours. The coating suspension was applied according to the requirements of the person skilled in the art (as described in DE102010007499A1).

In the case of the particulate filters according to the invention (Examples 1 to 5), the filters from Comparative Examples 1-3 were additionally impinged with a powder in the input channels.

The catalytically active filters thus obtained were investigated for their fresh filtration efficiency on the engine test bench in the real exhaust gas of a motor operated predominantly (>50% of the operating time) and on average (mean lambda over the running time) with a stoichiometric air/fuel mixture. A globally standardized test procedure for determining exhaust emissions, or WLTP (Worldwide harmonized Light vehicles Test Procedure) for short, was used here. The driving cycle used was WLTC Class 3. The respective filter was installed close to the engine immediately downstream of a conventional three-way catalyst. This three-way catalyst was the same for all filters measured. Each filter was subjected to a WLTP. In order to be able to detect particulate emissions during testing, the particle counters were installed upstream of the three-way catalyst and downstream of the particulate filter.

Some catalytically active particulate filters were also additionally subjected to engine test bench aging. The aging process consisted of an overrun cut-off aging process with an exhaust gas temperature of 950° C. before the catalyst input (maximum bed temperature of 1030° C.). The aging time was 38 hours. After aging, the filters were investigated for their catalytic activity.

In the analysis of catalytic activity, the light-off behavior of the particulate filters was determined at a constant average air ratio A on an engine test bench, and the dynamic conversion was checked when A changed.

Comparative Example 1

On wall-flow filters with a diameter of 118 mm and a length of 152 mm, a noble metal-containing coating suspension containing a cerium/zirconium mixed oxide, a lanthanum-doped aluminum oxide and barium sulfate was applied to 80% of the length of the output channel of the filter and subsequently calcined at 500° C. The grain size of the oxides of the coating suspension was selected such that the suspension was applied predominantly to the filter wall (only a small amount of the fraction of ultra-fine coating particles penetrates into the pores of the wall; less than 10%). After calcination, the coating amount of the VGPF1 corresponded to 67 g/l based on the volume of the substrate.

Comparative Example 2

On wall-flow filters with a diameter of 118 mm and a length of 118 mm, a noble metal-containing coating suspension containing a cerium/zirconium mixed oxide, a lanthanum-doped aluminum oxide and barium sulfate was applied in a first step to 60% of the length of the input channel of the filter and subsequently calcined. In a second coating step, a further noble metal-containing coating suspension was applied to 60% of the length of the output channel and subsequently calcined. The coating suspension used in the second coating step also contained a cerium/zirconium mixed oxide, a lanthanum-doped aluminum oxide and barium sulfate. The grain size of the oxides of the coating suspension was selected such that the suspension was applied predominantly to the filter wall. The amount of coating of the VGPF2 after calcination corresponded to 100 g/l based on the volume of the substrate.

Comparative Example 3

On a highly porous wall-flow filter with a diameter of 132 mm and a length of 102 mm, a noble metal-containing coating suspension containing a cerium/zirconium mixed oxide, a lanthanum-doped aluminum oxide and barium sulfate was applied in a first step to the entire length of the filter and subsequently calcined. The grain size of the oxides of the coating suspension was selected such that the suspension is predominantly located in the filter wall (>90%). The amount of coating after calcination corresponded to 100 g/l based on the volume of the substrate.

In a second coating step, a further noble metal-containing coating suspension was applied to 60% of the input channel and subsequently calcined. The coating suspension used in the second coating step also contained a cerium/zirconium mixed oxide, a lanthanum-doped aluminum oxide and barium sulfate. The grain size of the oxides of the coating suspension was selected such that the suspension was applied predominantly to the filter wall. The amount of coating of the VGPF3 after calcination corresponded to 132 g/l based on the volume of the substrate.

In order to increase the filtration efficiency of the catalytically coated filters described in Comparative Examples 1 to 3, the inflow channels thereof were impinged with various amounts and types of powder. In this case, the coating parameters were chosen such that the powder used was deposited mainly in the region of the substrate in which there was no on-wall coating (points of highest permeability). The production of the filters GPF1 to GPF5 according to the invention is explained in the following descriptions.

In the examples, the influence of the type and amount of powder used in different coating variants of the catalytic materials on filtration efficiency and catalytic activity was investigated.

Example 1

Figure 7:
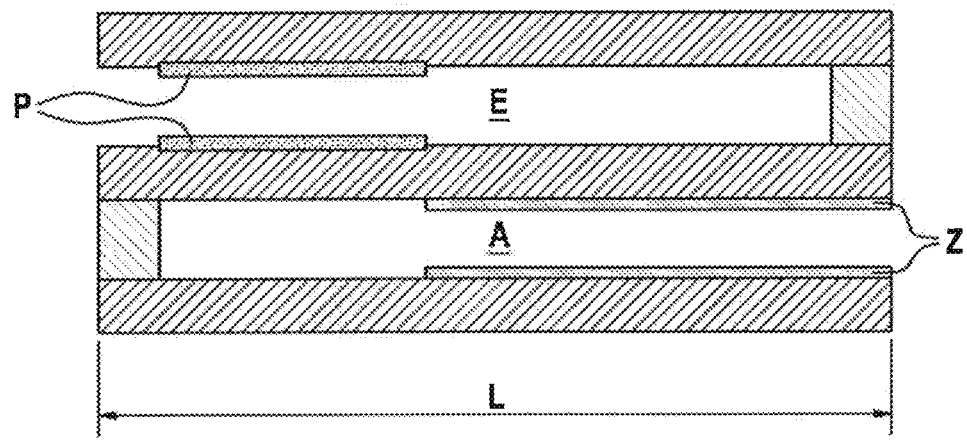
Figure 8:
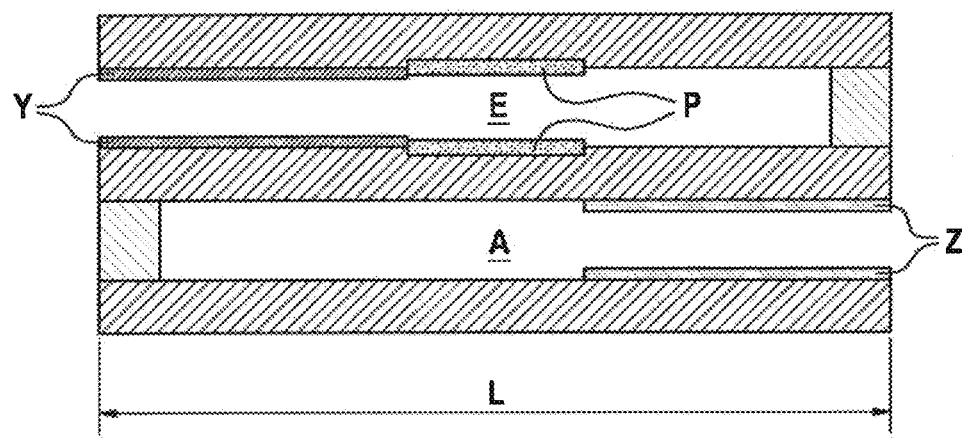

In order to increase the filtration efficiency of the catalytically coated filter VGPF1 described in Comparative Example 1, the inflow channels of the filter were impinged with 4 g/l of a highly porous aluminum oxide. The relative back pressure increase of the GPF1 compared to the VGPF1 was 8.6 mbar. The filter GPF1 described in Example 1 is outlined in FIG. 7.

Example 2

In order to increase the filtration efficiency of the catalytically coated filter VGPF1 described in Comparative Example 1, the inflow channels of the filter were impinged with 0.2 g/l of a pyrogenic aluminum oxide with a high melting point. The relative back pressure increase of the GPF1 compared to the VGPF1 was 5 mbar. The filter GPF2 described in Example 2 is outlined in FIG. 7.

Example 3

Figure 1:
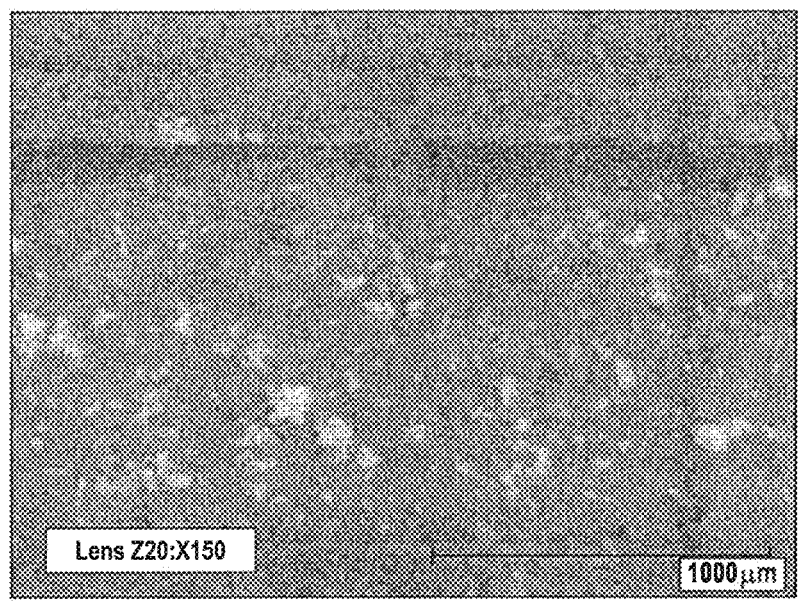
Figure 2:
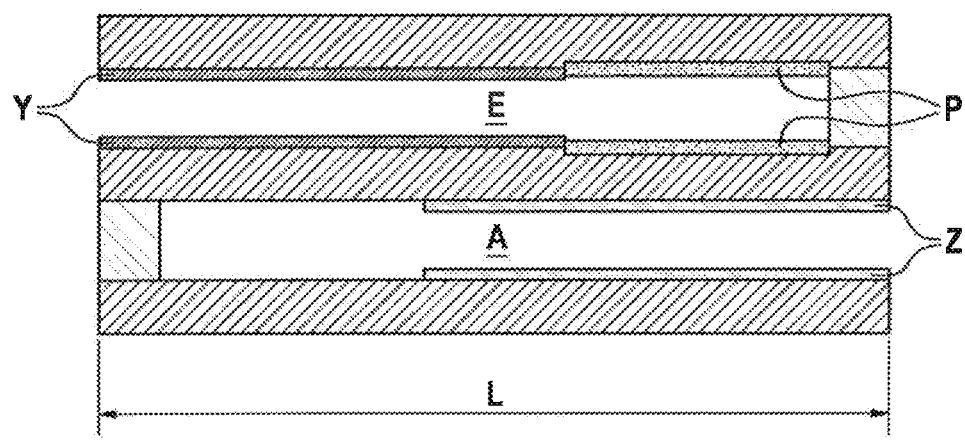
Figure 3:
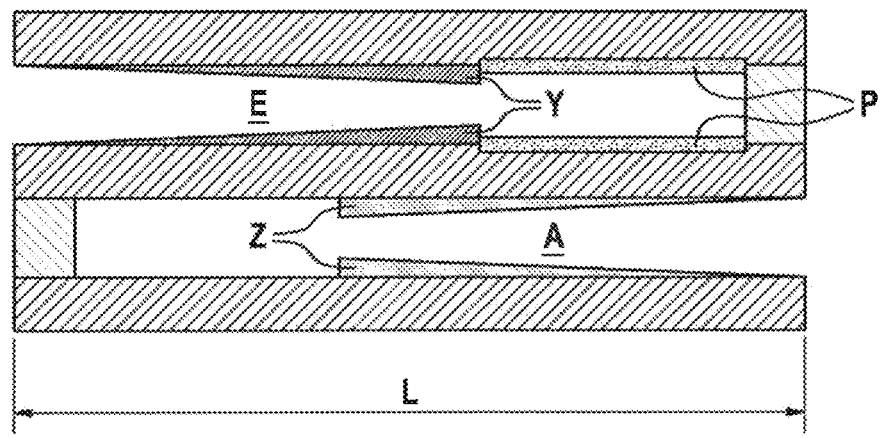

In order to increase the filtration efficiency of the catalytically coated filter VGPF2 described in Comparative Example 2, the inflow channels of the filter were impinged with 10 g/l of a highly porous aluminum oxide. The filter GPF3 described in Example 3 is outlined in FIG. 2.

Example 4

Figure 4:
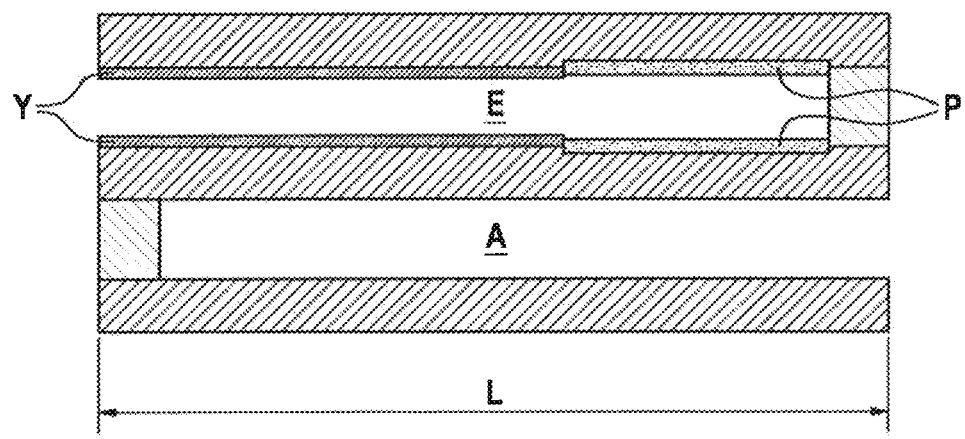
Figure 5:
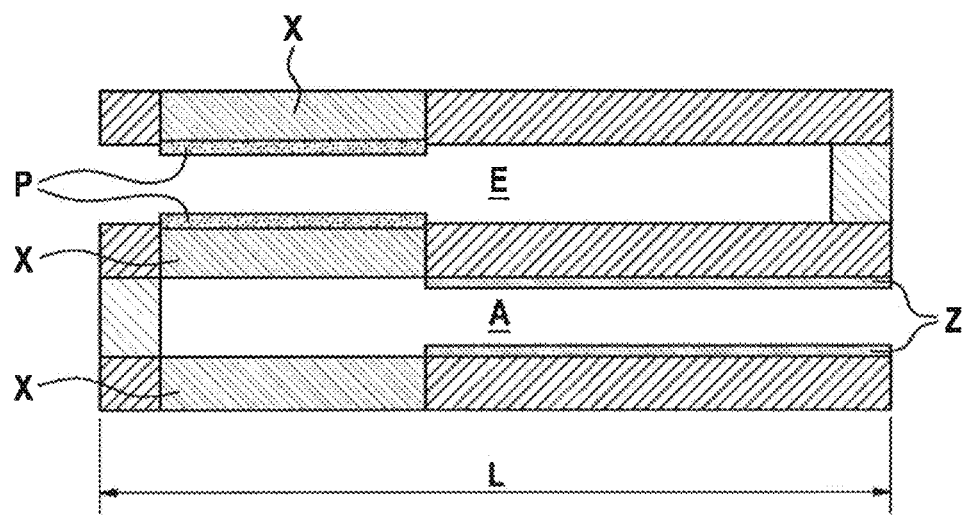
Figure 6:
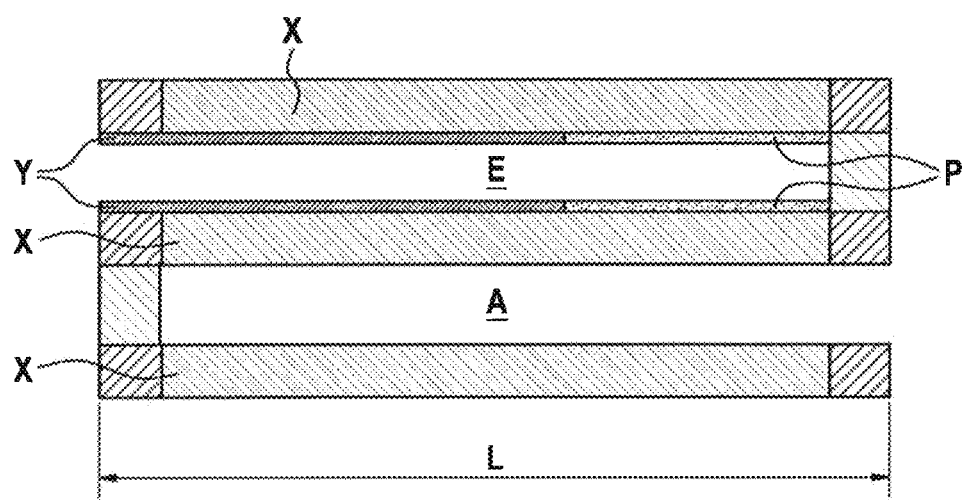

In order to increase the filtration efficiency of the catalytically coated filter VGPF3 described in Comparative Example 3, the inflow channels of the filter were impinged with 4 g/l of a highly porous aluminum oxide. The filter GPF4 described in Example 4 is outlined in FIG. 4.

Example 5

In order to increase the filtration efficiency of the catalytically coated filter VGPF3 described in Comparative Example 3, the inflow channels of the filter were impinged with 7 g/l of a highly porous aluminum oxide. The filter GPF5 described in Example 5 is outlined in FIG. 4.

Figure 9:
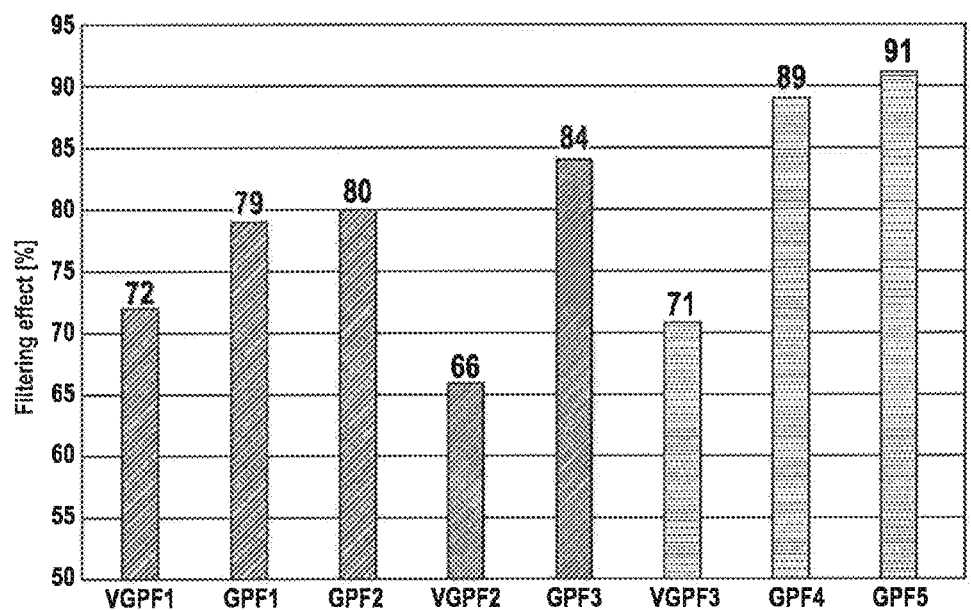
Figure 10:
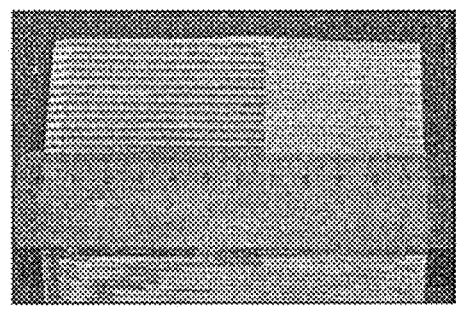
FIG. 10 shows a photograph of an opened filter with a zone of an on-wall layer in the inlet channels (gray, left side) and the region impinged with powder (right side).
Figure 11:
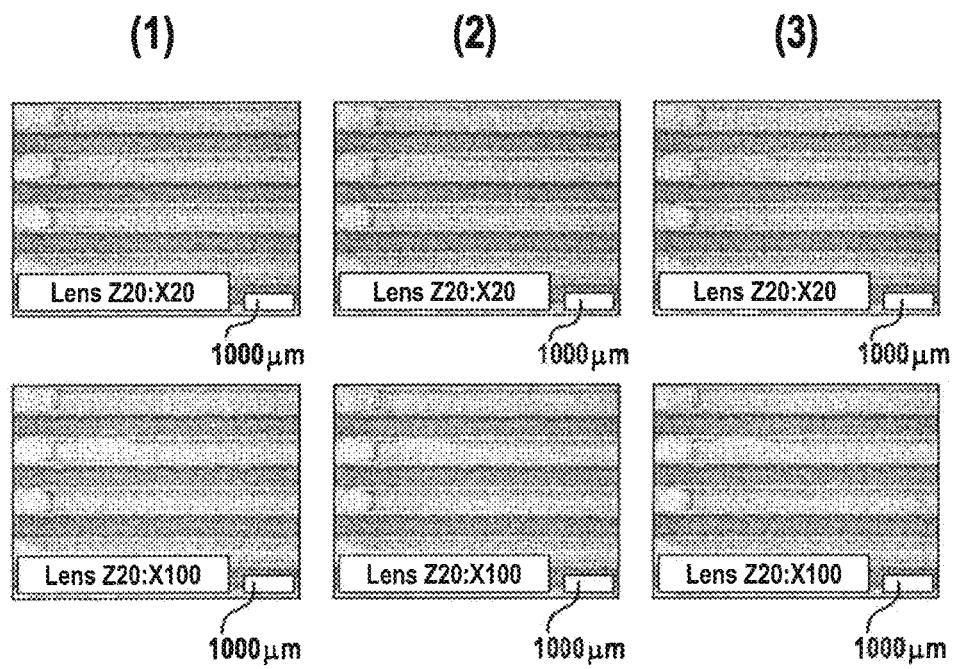
FIG. 11 shows enlargements of the filter of FIG. 10 with photos of the input (1), the center (2) and the output (3) of the filter.

Discussion of the Results from Filtration Efficiency Measurements of the Particulate Filters VGPF1 to VGPF3 Along with GPF1 to GPF5 Described in Comparative Examples and Examples As already described, the catalytically active filters produced in comparative examples and examples were each subjected to a WLTP on an engine test bench in order to investigate their filtering effect. The results from these investigations were shown in FIG. 9. FIG. 9 shows filtration values that have resulted from the raw particle emissions and particle emissions after the respective filter during a WLTP procedure.

The advantages of the filters GPF1 to GPF5 according to the invention can be clearly observed during the filtering effect measurement. Impinging the filter with a powder results in a filtration efficiency increase of up to 20%. The desired filtration efficiency can be adjusted by the quantity of powder used.

Replacing a highly porous aluminum oxide (GPF1) with a pyrogenic aluminum oxide (GPF2) reduces the amount of powder used from 4 g/l to 0.2 g/l. This leads to a saving of the powder used by 500% by weight with an unchanged filtration effect and a lower back pressure.

In order to check whether the filters impinged with powder have high catalytic activity, the particulate filters GPF4 and GPF5 were subjected to engine test bench aging and a subsequent measurement of the light-off behavior.

The table below contains the temperatures $T_{50}$ at which 50% of the considered components are respectively converted. In this case, the light-off behavior with stoichiometric exhaust gas composition ($\lambda$=0.999 with ±3.4% amplitude) was determined. The standard deviation in this test is ±2° C.

Table 1 contains the light-off data for the aged filters VGPF3, GPF4 and GPF5.

TABLE 1

|  | $T_{50}$ HC stoichiometric | $T_{50}$ CO stoichiometric | $T_{50}$ NOx stoichiometric |
|---|---|---|---|
| VGPF3 | 381 | 398 | 395 |
| GPF4 | 386 | 401 | 401 |
| GPF5 | 383 | 401 | 402 |

As the results show, impinging the catalytically active filters with a powder leads to a significant increase in filtration efficiency with an unchanged high catalytic activity and a low back pressure rise. The choice of powder may also significantly reduce the amounts of powder used.

It has been shown successfully that the catalytic activity of the zone-coated wall-flow filters, the exhaust-gas back pressure and the filtration efficiency can be adapted to the customer requirements in a targeted manner. A correspondingly produced wall-flow filter was not yet known from the prior art.

The invention claimed is:

1. A catalytically active wall-flow filter for removing particles from the exhaust gas of internal combustion engines, which comprises a wall-flow filter of length L and at least one catalytically active coating Y and/or Z, wherein the wall-flow filter comprises channels E and A, which extend in parallel between a first and a second end of the wall-flow filter and are separated by porous walls, which form surfaces $O_E$ and $O_A$, respectively, and wherein the channels E are closed at the second end and the channels A are closed at the first end, the coating Y, when present, is located in the channels E on the walls of the surfaces $O_E$, wherein the coating Y on the walls of the surface $O_E$ extends from the first end of the wall-flow filter to a length of less than the length L, the coating Z, when present, is located in the channels A on the walls of the surfaces $O_A$, wherein the coating Z on the walls of the surface $O_A$ extends from the second end of the wall-flow filter to a length of less than the length L, wherein an inlet region of channels E of the wall-flow filter has additionally been impinged with at least one dry powder-gas aerosol, and wherein the coating Y and/or Z has a thickness gradient over the length L such that the least thickness of the coating Y and/or Z prevails at the ends of the wall-flow filter.

2. The catalytically active wall-flow filter according to claim 1, wherein the inlet region of channels E of the wall-flow filter is impinged with the at least one dry powder-gas aerosol such that the powder precipitates in the pores of the wall-flow filter walls and fills the pores as far as the walls of the surfaces $O_E$.

3. The catalytically active wall-flow filter according to claim 1, wherein the coating Y extends from the first end of the wall-flow filter to a length of up to 90% of the length L.

4. The catalytically active wall-flow filter according to claim 1, wherein the coating Z extends from the second end of the wall-flow filter to a length of up to 90% of the length L.

5. The catalytically active wall-flow filter according to claim 1, wherein the coating Y and/or Z is at least 1.25 cm long.

6. The catalytically active wall-flow filter according to claim 1, further comprising a coating X that is located in the walls of the wall-flow filter and the coating X extends from the first or the second end of the wall-flow filter to a length of 100% of the length L.

7. The catalytically active wall-flow filter according to claim 1, wherein each of the coatings Y and Z are present, and the coatings Y and Z respectively contain one or more noble metals, which are fixed on one or more carrier materials, along with one or more oxygen storage components.

8. The catalytically active wall-flow filter according to claim 1, wherein each of the coatings Y and Z are present and contain a cerium/zirconium/rare earth metal mixed oxides as an oxygen storage component.

9. The catalytically active wall-flow filter according to claim 1, wherein the amount of powder in the wall-flow filter is less than 50 g/l.

10. The catalytically active wall-flow filter according to claim 1, wherein the powder is selected from the group consisting of silicon dioxide, aluminum oxide, titanium dioxide, zirconium dioxide, cerium oxide, iron oxide, zinc oxide, zeolites, metal-substituted zeolites or mixtures thereof.

11. The catalytically active wall-flow filter according to claim 1, wherein the powder precipitates in the pores of the filter walls and does not form a cohesive layer on the walls of the wall-flow filter.

12. The catalytically active wall-flow filter according to claim 1, wherein a tapped density of the powder is at most 900 kg/m3.

13. A method for producing the catalytically active wall-flow filter according to claim 1, that comprises providing the catalytically active coating Y and/or Z to the wall-flow filter.

14. The method for producing the catalytically active wall-flow filter according to claim 13, wherein the method includes, prior to impinging the wall-flow filter with the powder-gas aerosol, first dispersing the powder in a gas as to create a powder and gas dispersion combination, the powder and gas dispersion combination is then fed to a gas stream and is then subsequently sucked through the wall-flow filter and wherein the powder-gas aerosol is sucked through the wall-flow filter at a rate of 5 m/s to 50 m/s.

15. The method for producing the catalytically active wall-flow filter according to claim 13, wherein the powder has a moisture content of less than 20% at the time of impingement on the wall-flow filter.

16. A method of reducing harmful exhaust gases comprising passing the harmful exhaust gases through the catalytically active wall-flow filter according to claim 1.

17. The method according to claim 14, wherein, the powder and gas dispersion combination is sucked initially through an inlet region of the channels E of the wall-flow filter.

18. A catalytically active wall-flow filter for removing particles from the exhaust gas of internal combustion engines, which comprises a wall-flow filter of length L and at least one catalytically active coating Y and/or Z, wherein the wall-flow filter comprises channels E and A, which extend in parallel between a first and a second end of the wall-flow filter and are separated by porous walls, which form surfaces $O_E$ and $O_A$, respectively, and wherein the channels E are closed at the second end and the channels A are closed at the first end, the coating Y, when present, is located in the channels E on the walls of the surfaces $O_E$, wherein the coating Y on the walls of the surface $O_E$ extends from the first end of the wall-flow filter to a length of less than the length L, the coating Z, when present, is located in the channels A on the walls of the surfaces $O_A$, wherein the coating Z on the walls of the surface $O_A$ extends from the second end of the wall-flow filter to a length of less than the length L, wherein an inlet region of channels E of the wall-flow filter has additionally been impinged with at least one dry powder-gas aerosol, wherein the ratio of the average particle diameter (Q3 distribution; measured according to the most recent ISO13320 on the date of application) d50 in the dry powder aerosol and the average pore diameter of the wall-flow filter after coating with a washcoat (measured according to DIN 66134, latest version on the date of application) is between 0.03 and 2; and wherein the coating Y and/or Z has a thickness gradient over the length L such that the least thickness of the coating Y and/or Z prevails at the ends of the wall-flow filter.

19. The catalytically active wall-flow filter according to claim 18, wherein, the powder precipitates in the pores of the walls, but the powder does not form a cohesive layer on the walls of the wall-flow filter.

20. A method of reducing harmful exhaust gases comprising passing the harmful exhaust gases through the catalytically active wall-flow filter according to claim 18.

21. The catalytically active wall-flow filter according to claim 18, wherein each of coatings Y and Z are present.

* * * * *